Figure 10:
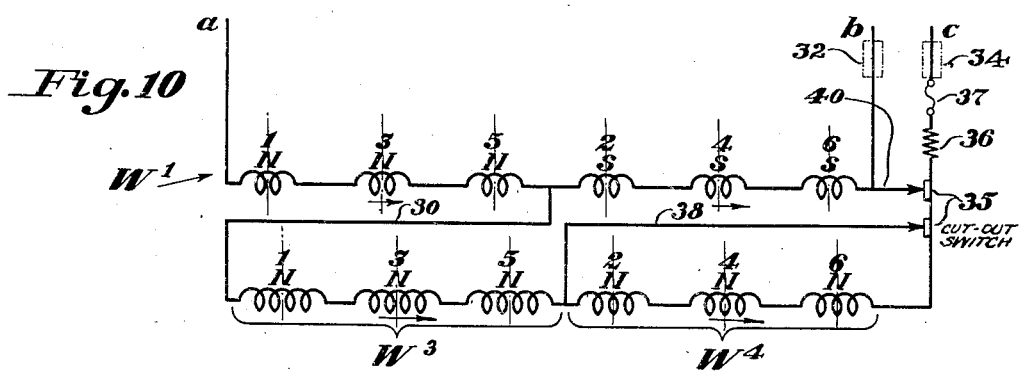

March 10, 1936.    C. L. KENNEDY    2,033,525
INDUCTION MOTOR
Original Filed March 12, 1931    4 Sheets-Sheet 1
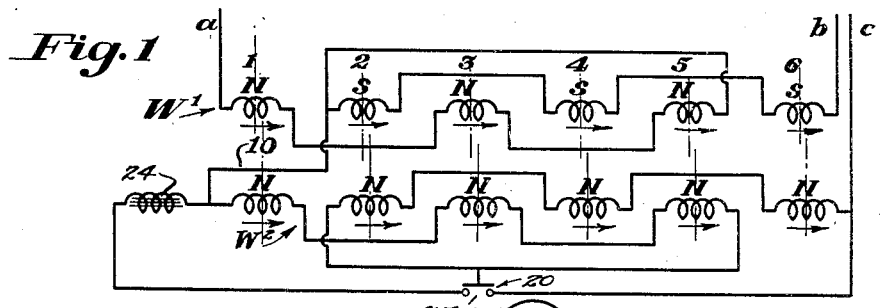
Fig.1
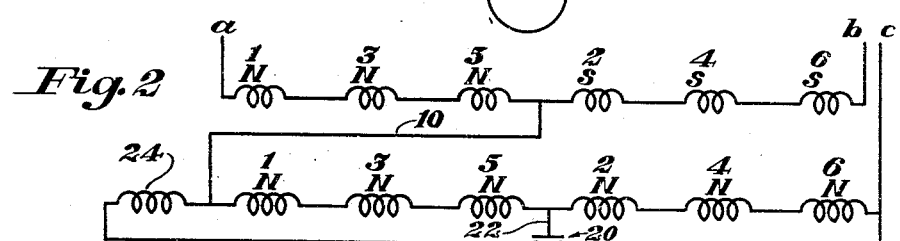
Fig.2
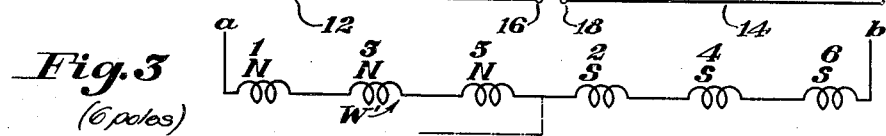
Fig.3 (6 poles)
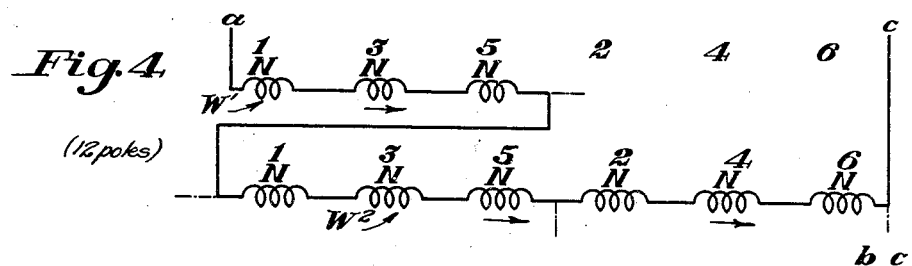
Fig.4 (12 poles)
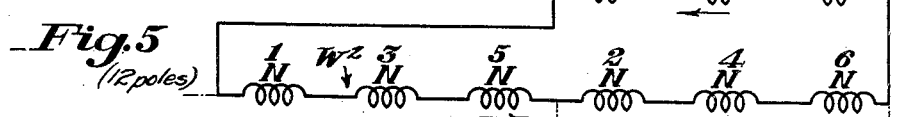
Fig.5 (12 poles)
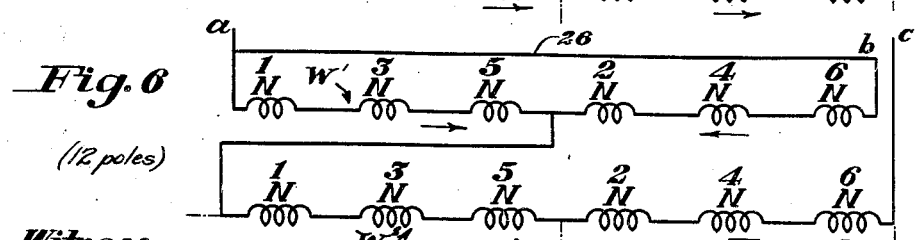
Fig.6 (12 poles)
Witness
Paul F. Bryant
Inventor
Carlton L. Kennedy
by his attorney
Van Evera, Fish, Hildreth & Clay

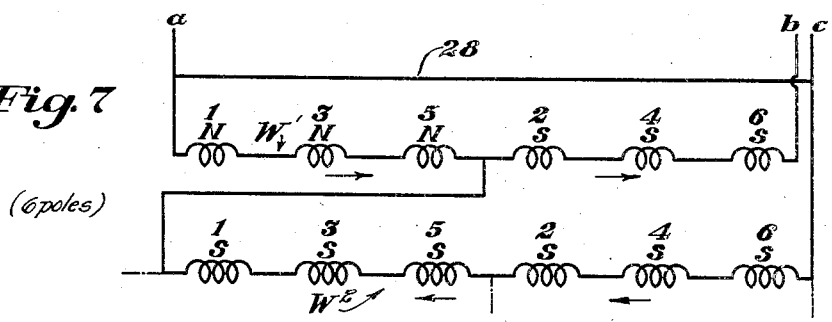
Fig. 7 (6 poles)
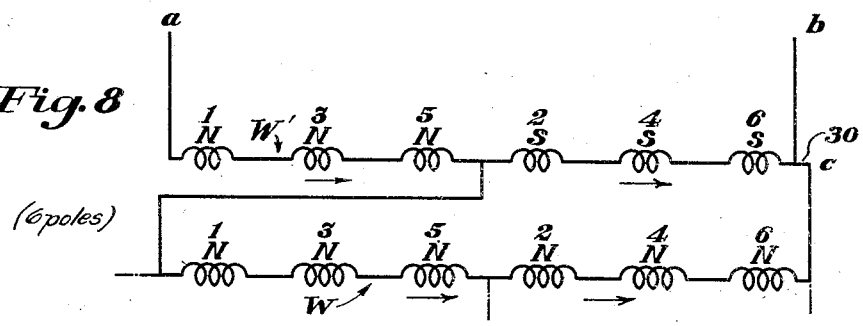
Fig. 8 (6 poles)
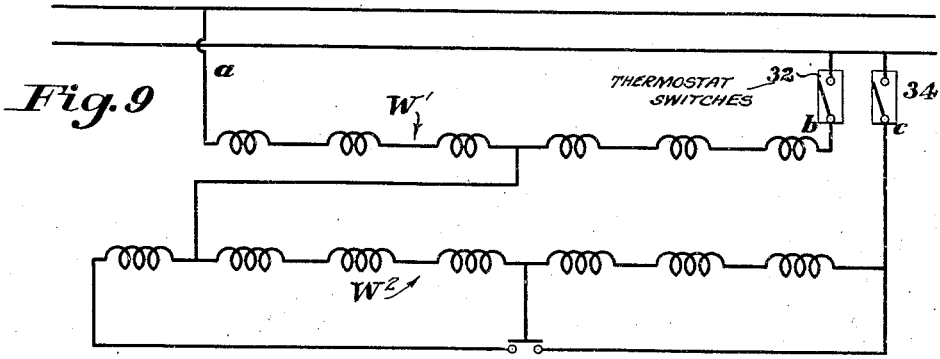
Fig. 9

March 10, 1936.  C. L. KENNEDY  2,033,525
INDUCTION MOTOR
Original Filed March 12, 1931  4 Sheets-Sheet 3

(6 poles)

(12 poles)

(6 poles)

Witness
Paul F. Bryant

Inventor
Carlton L. Kennedy
by his attorneys
Van Ernen, Fish, Hildreth & Kay

March 10, 1936.    C. L. KENNEDY    2,033,525
INDUCTION MOTOR
Original Filed March 12, 1931    4 Sheets-Sheet 4

Witness
Paul F. Bryant

Inventor
Carlton L. Kennedy
by his attorneys
Van Braun, Frick, Hildreth Hay

Patented Mar. 10, 1936

2,033,525

UNITED STATES PATENT OFFICE 2,033,525

INDUCTION MOTOR

Carlton L. Kennedy, Braintree, Mass., assignor to The Holtzer-Cabot Electric Company, Roxbury, Mass., a corporation of Massachusetts Application March 12, 1931, Serial No. 521,951
Renewed May 27, 1935

39 Claims. (Cl. 172—278)

The present invention relates to multi-speed induction motors.

One object of the present invention is to provide a single-phase induction motor of simple and inexpensive construction having provision for operating at a plurality of speeds.

Another object of the present invention is to provide a multi-speed single-phase induction motor having a plurality of line leads and so arranged that it will operate without destructive internal losses regardless of the manner in which the leads are connected to the lines.

Another object of the invention is to provide a simple and efficient automatic speed control for induction motors.

With these objects in view, the principal feature of the invention comprises a motor having high and low speed windings, together with leads therefor, and means whereby excessive currents or voltages are not permitted to exist in any part of the motor, regardless of the connections of the leads. It is an important advantage of the invention that no destructive losses will occur even though the user may make a careless connection of the leads to the line. In the simplest and best form of motor yet devised, the stator or primary employs two windings—a high speed alternate pole winding and a low speed consequent pole winding, together with leads whereby the high speed winding may be energized for high speed operation regardless of connections of the low speed winding to the lines and whereby the low speed winding may be energized in series with a portion of the high speed winding for low speed operation.

Another feature of the invention contemplates the use of high speed and low speed windings which are displaced from each other and which are both energized at starting to provide a satisfactory starting torque, thereby avoiding the necessity for separate starting windings.

Other features of the invention consist of certain novel features of construction, combinations and arrangement of parts hereinafter described and particularly defined in the claims.

Figure 11:
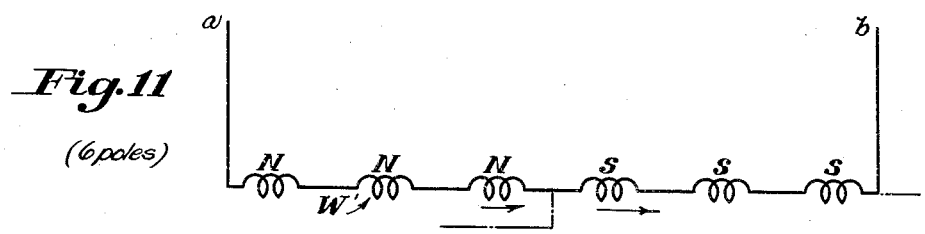
Figure 12:
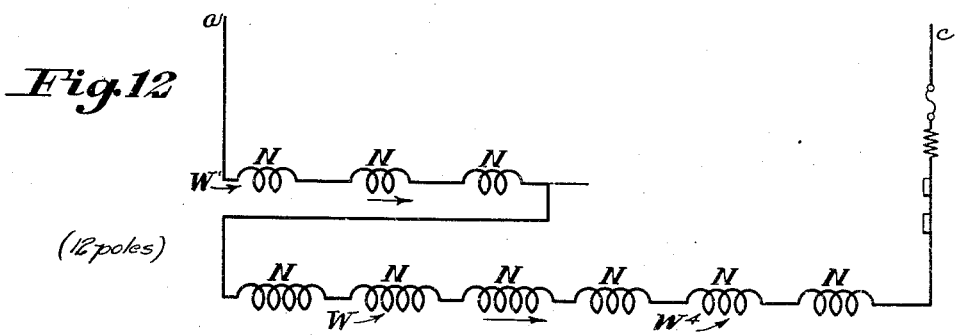
Figure 13:
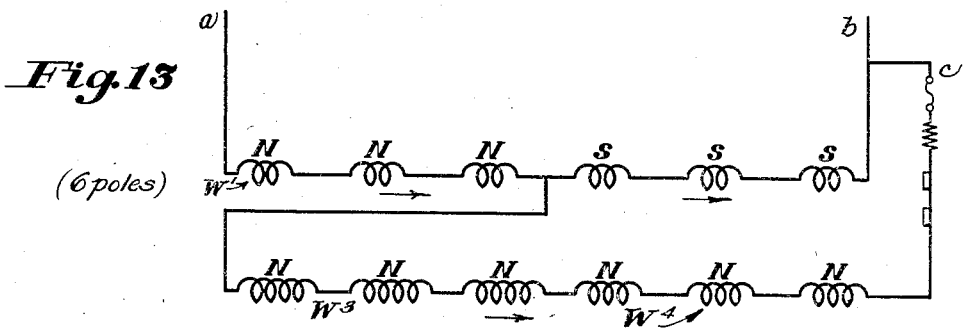
Figure 14:
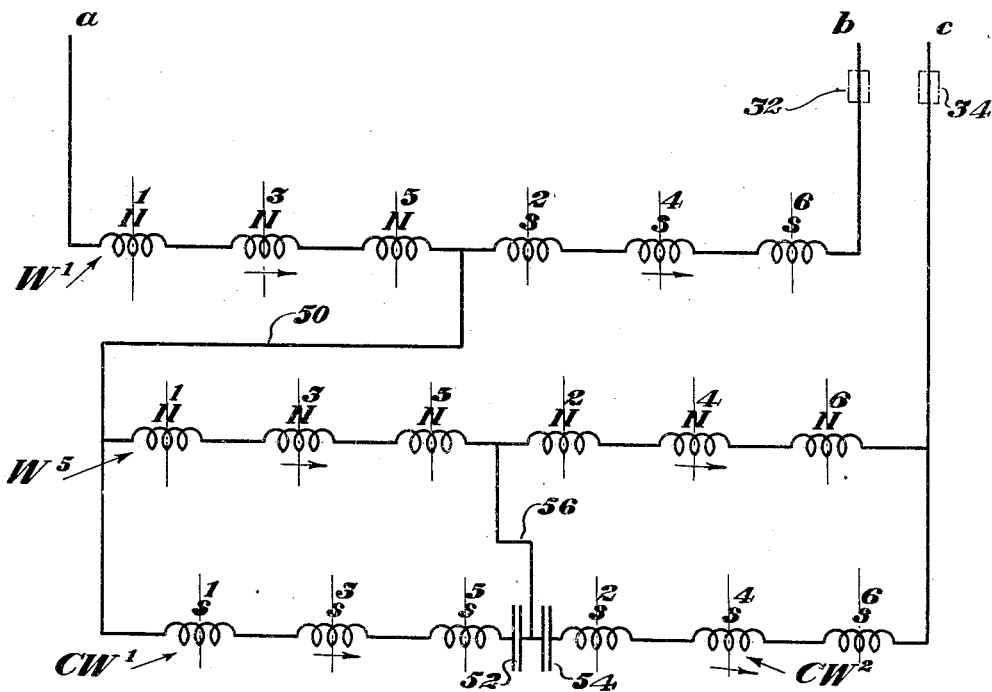

In the accompanying drawings Fig. 1 is a diagram of the connection of windings for a motor according to the present invention; Fig. 2 is a simplified diagram of the same windings shown in Fig. 1; Figs. 3 to 8 inclusive are diagrams illustrating the operation of the motor for different connections of the leads to the lines; Fig. 9 is a diagram of the motor as embodied in a system for automatic speed control; Fig. 10 is a diagram of connections for a modified form of motor; Figs. 11, 12 and 13 are diagrams illustrating the operation of the motor of Fig. 10 for different connections; and Fig. 14 is a diagram of the stator winding connections for a condenser induction motor according to the present invention.

The motor shown in Figs. 1 to 8 is herein illustrated and described as a two-speed changeable pole motor adapted to operate with either six or tweleve poles, although the motor may be wound for any number of poles. As shown in Fig. 1, the motor comprises a rotor R and two windings W' and W² each having six sections, the postions of which are indicated at 1, 2, 3, 4, 5 and 6. The winding W' has one end connected to the lead $a$ and has three sections in series wound on poles 1, 3 and 5, and three other sections in series wound on poles 2, 4 and 6, and is connected at its opposite end to the lead $b$. The six sections are permanently connected together between the leads $a$, $b$, to form alternate north and south poles, as indicated in Fig. 1.

The winding W² also comprises six sections wound on poles 1, 3, 5, and 2, 4, 6 in series. The winding W² is displaced slightly from the winding W', preferably by an angle of about 15 electrical degrees. The construction is such that the winding W² is closed on itself for starting and is adapted to be connected in series under some connections with a part of the winding W' under running conditions. The use of a winding which is closed on itself for starting and which is connected in series with another winding for running, it disclosed in my Patent No. 1,912,338, granted May 30, 1933. The sections in the winding W² are wound for consequent poles, that is, for poles of the same polarity when traversed by currents in the same direction. The winding W² has a different time constant from the winding W'. This is preferably effected by using a larger number of turns in the winding W², thus varying its ratio of resistance to reactance. A connection 10 leads from the junction of sections 5 and 2 of the winding W' to the left-hand end of the first section of the winding W², the last section of which is connected to a line lead $c$.

In order to simplify the diagram, the motor is shown in Fig. 2 with the poles indicated in the order 1, 3, 5 and 2, 4, 6. Instantaneous polarities of the different sections are indicated for given directions of current. Thus for currents flowing from left to right in the winding W', as indicated by the arrows, the poles 1, 3 and 5 are north, and the poles 2, 4, and 6 are south; while for current in the same direction in the winding W², all poles are north. The winding W² is connected into two starting circuits by means of a wire 12 connected with the left-hand end of the first section and a wire 14 connected to the right-hand end of the sixth section. The wires 12 and 14 connect respectively with contacts 16 and 18 of a cutout switch 20, the movable bridge contact of which is connected by a wire 22 with the mid-point of the winding $W^2$. In the wire 12 is included an impedance 24 which acts as a current limiting impedance for some connections. This impedance may be external to the motor but in order to save space may be actually wound as a winding on one or more poles, preferably in the same space position as sections 1, 3 and 5 of the winding $W^2$, and in such a direction as to augment the flux of the winding $W^2$. This impedance 24 comes into use only during starting and is useful as a current limiting impedance only when the lead $c$ is connected to the opposite side of the line from either or both of the leads $a$ and $b$. When the cutout switch is closed, as at starting, the three sections of the winding $W^2$ which are wound at poles 1, 3 and 5 are short-circuited through the wire 12 and the impedance 24, while the other three sections of the winding are short-circuited through the wire 14. The sections of the winding $W^2$ are energized by induction from the winding $W'$ and since the windings are displaced in space and carry currents out of time phase because of the difference in their time constants, a starting torque is produced. When the motor comes up to speed, the cutout switch is opened automatically and the starting circuits 12 and 14 are isolated from the rest of the system. The motor then operates either as a six-pole or twelve-pole motor, depending upon the line connections.

Since there are three leads indicated at $a$, $b$ and $c$, there are six possible connections of these leads to the line. In motors having a plurality of external leads, it is usually necessary to exercise some care in connecting them to the line. The present invention, however, permits any possible connection of the leads to the lines without giving rise to any destructive internal losses.

The operation under all possible connections is shown in Figs. 3 to 8 inclusive. In each of these figures, the sections of the windings are marked with the instantaneous polarities which the individual sections tend to form for assumed instantaneous current directions (as indicated by the arrows in each case) under running conditions. These figures show only those parts of the stator circuits which are active under running conditions, the starting conditions being in general identical for all connections in that the short-circuited halves of the winding $W^2$ carry induced starting currents out of phase with the currents in $W'$.

The six possible connections are as follows:
1. Leads $a$ and $b$ to lines.
2. Leads $a$ and $c$ to lines.
3. Leads $b$ and $c$ to lines.
4. Leads $a$—$b$ and $c$ to lines.
5. Leads $a$—$c$ and $b$ to lines.
6. Leads $a$ and $b$—$c$ to lines.

The connections for the first case are shown in Fig. 3, the leads $a$ and $b$ being connected to the lines and the lead $c$ being inactive. The main winding $W'$ is energized as a six-pole alternate pole winding, the poles 1, 3 and 5 having an instantaneous north polarity indicated by N, and poles 2, 4 and 6 having the opposite polarity indicated by S.

In the second case, leads $a$ and $c$ are connected to the lines, lead $b$ being inactive. The second, fourth and sixth sections of winding $W'$ are inactive. At starting, a circuit is completed from the line $a$ through the first, third and fifth sections of the winding $W'$, the connection 10, the current limiting impedance 24, and the wires 12 and 14 to the line lead $c$. The first, third and fifth sections of the windings $W^2$ are energized by induction from the winding $W'$. When the motor comes up to speed, the cutout switch is opened and the complete circuit is traced, as shown in Fig. 4, through sections 1, 3, 5 of the winding $W'$ and all sections of the winding $W^2$ in series, the current directions being such as to produce the same instantaneous polarities for all poles. The poles are consequent poles. The motor therefore operates as a twelve-pole motor at half the speed of the connection shown in Fig. 3. It will be noted that north poles 1, 3 and 5 are somewhat stronger than poles 2, 4 and 6, and also because of the slight displacement between the sections of the winding $W'$ and the corresponding sections of the winding $W^2$, the axes of the first, third and fifth poles will be shifted slightly from the normal axes of the poles formed by the winding $W^2$. However, the winding $W^2$ has more turns and therefore higher impedance than the winding $W'$, so that $W^2$ is the stronger or predominant winding for this connection. Any unbalance is therefore slight, and since it is symmetrical about the motor, it is of negligible consequence.

The third case, with leads $b$ and $c$ connected to the lines and lead $a$ inactive, is shown in Fig. 5. This is exactly similar to the connection of Fig. 4 with the exception that the sections wound on poles 2, 4 and 6 of the winding $W'$ are substituted for the sections wound on poles 1, 3 and 5. The current flow in the active sections of winding $W'$ is opposite to the direction of current indicated in the diagram of Fig. 2 so that the poles 2, 4 and 6 are reversed in polarity, that is, they become instantaneous north poles. Under running conditions, the operation is identical to that of the connection of Fig. 4.

The fourth case is shown in Fig. 6, the leads $a$ and $b$ being connected by a wire 26. The leads $a$ and $b$ together are connected to one line and the lead $c$ is connected to the other line. Under running conditions, all poles of the winding $W'$ have the same instantaneous polarity as do all sections of the winding $W^2$. This connection is therefore a combination of the cases shown in Figs. 4 and 5, for twelve-pole operation, with the difference, however, that all sections of both windings are utilized. It will be seen that the first, third and fifth sections of the winding $W'$ are in parallel to the second, fourth and sixth sections. It is in this case that the impedance 24 is most necessary because the starting current flowing from the winding $W'$ through the connection 10 to the line $c$ is at its maximum on account of the low impedance of the parallel connections of the halves of the winding $W'$. It will be noted that there is no unsymmetrical strengthening or displacement of poles, as occurs to a slight extent in the second and third cases.

The fifth case is shown in Fig. 7, the leads $a$ and $c$ being connected by a wire 28 and together connected to one line while the lead $b$ is connected to the other line. This connection gives six-pole operation, the sections of the winding $W'$ having the same polarities as in the first case shown in Fig. 3. The winding $W^2$ under running conditions is, however, left continuously in circuit. By virtue of the connections 10 and 28, the winding W² is connected across the first half of the winding W' and therefore has approximately one-half line voltage continuously impressed upon it. The effect of this line voltage is to cause a current to flow continuously, which tends to form poles of polarity opposite those indicated in Fig. 2. Instantaneous polarities are indicated as N for poles 1, 3 and 5 of the winding W'; as S for poles 2, 4, and 6 for winding W'; and as S for all poles of the winding W². It is to be noted that the actual polarities are as indicated above the winding W', there being no south poles actually formed by sections 1, 3 and 5 of the winding W². The effect, however, is that the north poles 1, 3 and 5 are weakened and the south poles 2, 4 and 6 are correspondingly strengthened, that is to say, the ampere turns on the north poles are reduced and the ampere turns on the south poles are increased, resulting in substantially no change in the flux density in any magnetic circuit. The winding W' therefore operates practically as in the first case (Fig. 3), the winding W² having practically no resultant effect on the flux or voltage conditions in the motor. However, since the winding W² is continuously energized, there is some increase of internal losses over the connection shown in Fig. 3.

These additional internal losses are small for the following reasons: In the first place, the winding W² has more turns and higher impedance than W'. Moreover, the flow of current in W² is determined not only by the relative impedances of W² and the first half of W', but also by the voltages induced in the sections of W² by flux linkages with corresponding sections of W'. The voltages induced in sections 1, 3 and 5 and the voltages induced in 2, 4 and 6 of W² oppose each other and would completely balance out if equal currents flowed in both halves of W'. However, the current in sections 1, 3 and 5 of W' is less than the current in sections 2, 4 and 6, and therefore there exists in W² a resultant induced voltage which opposes the voltage impressed thereon and therefore prevents building up of the current in W² to more than a small value. The motor therefore successfully operates at high speed as a six-pole motor. This connection involves the use of a six-pole winding W' across one-half of which is connected the twelve-pole winding W². For this connection, the six-pole winding is the stronger or predominant winding, the winding W² being relatively weak because of its higher impedance.

The diagram of Fig. 8 for the sixth case shows another connection for six-pole operation which is substantially identical in operation with the connections of Fig. 7. Leads b and c are connected by a wire 30 and are together connected to one line while lead a is connected to the other line. Under running conditions, the winding W' forms poles of the same polarity as in Fig. 7. The winding W² being connected across the right-hand half of the winding W' has one-half line voltage impressed on it so that the currents set up therein are in a direction opposite to the current of the connection in Fig. 7. The winding W² tends to form all north poles, thereby strengthening poles 1, 3 and 5, and weakening poles 2, 4 and 6. The effect under operating condition is identical with the connection of Fig. 7.

Of the six possible connections described above, cases 1, 5 and 6 give six-pole or high speed operation, and cases 2, 3 and 4 give low speed or twelve-pole operation. For six-pole operation, the connection of case 1 (Fig. 3) is advantageous in that it has minimum internal losses, but the connections of Figs. 7 and 8 are entirely practicable and permit continuous operation with slightly higher but not excessive losses. The connections of Figs. 7 and 8 are particularly useful for loads such as fan loads which require a low starting torque and which therefore permit the use of a winding W² which is relatively weak as compared with the winding W' (that is, having a greater number of turns and hence, higher impedance).

For twelve-pole operation, the connection of case 4 (Fig. 6) is to be preferred not only because of the fact that it utilizes all of the windings of the motor, but also because it maintains the same angle between all of the polar axes under running conditions. In any case, the motor performs satisfactorily no matter how the connections are made, and therefore is strictly foolproof in that no destructive effects can be brought about by careless connection of the motor to the lines.

It will be noted that the windings W' and W² are so arranged for the different connections that one of them becomes the main working winding for one speed, and the other becomes the working winding for the other speed. Thus, for six-pole or high speed operation (Figs. 3, 7 and 8) W' is the working winding, W² being then entirely inactive as in Fig. 3, or relatively weak and hence practically ineffective, as in Figs. 7 and 8. For twelve-pole or low speed operation (Figs. 4, 5 and 6) W² is the main working winding, which predominates because the greater part of the line voltage is impressed upon it.

The impedance 24 comes into action only at starting, and is then useful to limit the starting current, particularly for the connection of the fourth case, where full line voltage would be impressed on the two halves of W' in parallel if the impedance were omitted. This impedance may be omitted in motors used for loads requiring low starting torque, where the rush of starting current is of short duration. However, since this impedance is preferably formed as a separate winding wound on the poles of W², it adds little to the cost of manufacture.

It will be noted that although there are six possible connections of the motor to the line, these connections fall into two general classes. In the first class, the leads a and b of the alternate pole winding are connected to opposite lines, and the motor operates at high speed regardless of the connection of the lead c (cases 1, 5 and 6); in the second class, the lead c of the consequent pole winding is connected to one line, and either or both of the leads of the alternate pole winding are connected to the opposite line (cases 2, 3 and 4), the motor then operating at low speed.

The diagram of Fig. 9 shows an automatic two-speed control employing the motor, as above described, having the lead a connected to one line, the lead b connected to the second line through a switch 32, and the lead c also connected to the second line through a switch 34. The switches 32 and 34 are preferably automatic switches operating by thermostatic or other means under different conditions. That is, assuming the motor is used to drive a fan for a unit heater, the switch 32 may be arranged to open at 70° and the switch 34 to open at 72°. When both switches are closed, the six-pole high speed operation of Fig. 8 results. When the switch 32 is opened, the twelve-pole low speed operation of Fig. 4 results, and when both the switches 32 and 34 are opened, the motor stops.

In practice, the difference in setting between the switches 32 and 34 may be of any desired value and a further advantage may be obtained by such a construction of the thermostats that they open and close the switches at different temperatures. Thus, the switch 32 may be arranged to close at 69° and to open at 70°, while the switch 34 may be arranged to close at 70° and open at 72°. When the temperature drops below 69°, both switches are closed for high speed operation. When the temperature reaches 70°, the switch 32 is opened, thereby permitting low speed operation with only the switch 34 closed. If the low speed operation is insufficient to maintain the temperature, the switch 32 will again close for high speed operation when the temperature falls below 69°. If, however, the low speed operation is sufficient to raise the temperature, the temperature will increase until it reaches 72°, when the switch 34 will open.

The motor shown in Fig. 9 is adapted for any form of automatic switch control and is not limited to temperature controlled devices.

The motor of Fig. 10 is a modified form of fool-proof motor having a plurality of leads so arranged that any connection will not produce excessive losses. This motor is in some respects preferable to that described above, in that it permits somewhat more efficient operation on some connections.

The motor, as shown in Fig. 10, is a two-speed changeable pole motor adapted for operation with either six or twelve poles. The motor comprises a six-pole winding W' similar to the winding W' of the motor previously described. This winding is wound for six alternate poles, the first half of the winding wound on poles 1, 3 and 5 forming instantaneous north poles, and the sections 2, 4, and 6 forming instantaneous south poles. The motor also has two windings indicated at $W^3$ and $W^4$ which are connected in series to form in effect a single twelve-pole consequent pole winding. The winding $W^3$ is wound on poles 1, 3 and 5 and the winding $W^4$ is wound on poles 2, 4 and 6, corresponding sections of these windings being displaced slightly from the sections of winding W'. All of the sections of windings $W^3$ and $W^4$ are arranged to produce instantaneous poles of the same polarity, indicated as north poles. Both of the windings $W^3$ and $W^4$ are wound with a greater number of turns per pole than the winding W'. Moreover, it is preferred to employ in the winding $W^3$ a number of turns per pole which is equal to the number of turns per pole of winding $W^4$, plus the number of turns per pole of the winding W'. Thus, in a typical motor, the turns per pole of W', $W^3$ and $W^4$ may be in the ratio of 3:10:7. The winding W' is connected at its mid-point to the winding $W^3$ by a connection 30. The winding W' is permanently connected to the leads $a$ and $b$. The end of the winding $W^4$ is connected to the lead $c$ through the contacts of a two-pole cutout switch 35, a current limiting resistance 36, and a fuse 37. From the junction of the windings $W^3$ and $W^4$, a connection 38 runs to one pole of the cutout switch, and from the end of the winding W' another connection 40 leads to the other pole of the cutout switch. The cutout switch is preferably of a type to open both connections 38 and 40 automatically when the motor comes up to speed.

As with the form of motor first described, the first portion (poles 1, 3 and 5) of the high speed winding W' forms poles identical in polarity and at least approximately coincident with certain of the poles of the low speed windings, while the second portion of the high speed winding (poles 2, 4 and 6) gives poles non-identical with poles of the low speed windings. The connection 30 is made to the junction of the two portions of the high speed winding, so that, as will presently be explained, the first portion of the high speed winding is used in both high and low speed operation.

It will be seen that although as in the previously described construction there are six possible ways of connecting the leads to the lines, on three of these connections, involving the connections of leads $b$ and $c$ to opposite lines, the fuse will be blown. The resistance 36 is used only to protect the contact surfaces of the switch 35 upon the initial rush of the short-circuit current, due to improper connections, and may be of such small value as not to reduce appreciably the voltage impressed on the motor windings when properly connected.

In view of the fact that three of the six possible connections to the line result in blowing the fuse, it is necessary to consider only the following three cases:

(1) Leads $a$ and $b$ to the lines.
(2) Leads $a$ and $c$ to the lines.
(3) Leads $a$ and $b$—$c$ to the lines.

It will be noted that if leads $a$ and $c$ are connected to one line, and $b$ to the other line, the fuse will blow, but the motor will operate as in the first case.

The diagram of connections under running conditions for the first case, namely, with the leads $a$ and $b$ to opposite lines is shown in Fig. 11. The motor operates as an ordinary six-pole motor. Under starting conditions, the winding $W^4$ is energized by induction from sections 2, 4 and 6 of winding W'. Since the winding $W^4$ is short-circuited, it carries a considerable current which is displaced in time and space from the current in W'. $W^3$ is also energized by approximately half-line voltage because of its connection across three sections of the winding W'. A considerable starting torque is produced by the currents flowing in both of the windings $W^3$ and $W^4$. As the motor comes up to speed, the cutout switch is operated and the motor runs under the connection of Fig. 11.

The low speed connection for twelve-pole operation is effected by connecting leads $a$ and $c$ to opposite lines. The conditions at starting are exactly similar to those of the first case. However, when the cutout switch opens, the connections are as shown in Fig. 12, sections 1, 3 and 5 of the winding W' being in series with both windings $W^3$ and $W^4$. The windings form all north poles, thus giving twelve-pole or low speed operation. It will be noted that for the turns ratios specified above, the turns per pole on poles 1, 3 and 5 are somewhat greater than on poles 2, 4 and 6; also that poles 1, 3 and 5 are shifted slightly from their normal axes. The effect of any electrical unbalance is, however, practically negligible.

The third case which gives six-pole or high speed operation is shown for running conditions in Fig. 13, lead $a$ being connected to one line and leads $b$ and $c$ together being connected to the other line. The starting conditions are identical with the other cases. The winding W' is the predominant winding and determines the alternate north and south poles. The windings $W^3$ and $W^4$ being connected in series across one-half of the winding $W'$, carry a current which strengthens poles 1, 3 and 5 and weakens poles 2, 4 and 6. Because of the relatively high impedance of the windings $W^3$ and $W^4$, there is practically no unbalance of flux conditions. The motor shown as connected in Fig. 13 offers the important advantage that the presence of the windings $W^3$ and $W^4$ does not increase the internal losses appreciably over the losses for the connection of Fig. 11. This follows from the turns ratio of the windings. Considering, for example, the conditions existing if the lead $c$ is opened, an induced voltage opposed to the line voltage will exist in each section of the winding $W'$. Neglecting impedance drops, the sum of the induced voltages in the winding $W'$ equals the line voltage. In each section of the winding $W^3$, there is induced a voltage by transformer action, which voltage is in the same direction as the voltage in the corresponding section of $W'$ but in the ratio of 10 to 3. In each section of $W^4$, there is induced a voltage in the ratio of 7 to 3 with respect to the voltage in a corresponding section $W'$, but inasmuch as the sections of $W^4$ are wound for polarity opposite to that of sections 2, 4 and 6 of $W'$, these voltages are opposed to the voltages in $W^3$. The resultant voltage existing across $W^3$ and $W^4$ in series is therefore equal to the voltage in the second section of $W'$. Accordingly, the lead $c$ is at the same potential as lead $b$ and may be connected directly to it, as shown in Fig. 13, without appreciable increase in the internal losses. This explanation neglects impedance drops and the slight space displacement of the low and high speed windings, which permit some circulating current with a consequent slight loss. However, any such loss is partially or wholly compensated by the diminished effective impedance afforded by the parallel winding sections. The load divides between the windings in a proportion determined by their total impedances.

The motor therefore has one low speed connection (Fig. 12) and two high speed connections (Figs. 11 and 13). In any case, it is impossible to damage the motor by improper connections to the line.

The operation of the motor of Fig. 10, particularly with relation to the third case, may be explained in another way, as follows. The winding $W^3$ may be considered as a winding having the same number of turns per pole as $W^4$ plus a series winding having additional turns per pole. Thus in the example given, if $W'$ has 300 turns per pole $W^4$ has 700 turns per pole, and $W^3$ has 700 plus 300 turns per pole. The additional turns (300 per pole or 900 in all) are wound on poles of the high speed winding and are equal in total number to the total turns of that portion of the high speed winding with which the low speed winding may be connected in parallel. These additional turns have induced in them a voltage equal to the voltage across the second portion of the high speed winding, thereby permitting the connection between leads $b$ and $c$ shown in Fig. 13.

So far as the voltage balance for high speed operation is concerned, it is not necessary that the additional turns above mentioned be wound with any particular relation to the poles of the low speed winding. But if the high and low speed windings have one or more poles with approximately coincident axes and of the same polarity, and if the additional turns are wound on said poles, then those additional turns form a useful part of the low speed winding. This is the case in the motor of Fig. 10, in which the additional 900 turns are wound on the three poles 1, 3 and 5 which are of the same polarity for both windings.

The resistance 36, as described above, is only for the purpose of protecting the switch contact surfaces. This resistance is not in series with any main load carrying winding on either high speed connection and is in series only with the high impedance windings $W^3$ and $W^4$ on the low speed connections. Since a resistance of only a small size is necessary to protect the switch surfaces, it will be seen that it has no appreciable effect on the operation of the motor under any conditions.

The motor shown in Fig. 10 may be used for dual speed service by employing two automatic switches in the leads $b$ and $c$ in exactly the same manner as the motor of Fig. 9 is connected. These switches, when used, are placed as indicated at 32 and 34 in Fig. 10. When both switches are open, the motor stops. When the switch in line $c$ closes, low speed operation of Fig. 12 results, and when both automatic switches are closed, high speed operation of Fig. 13 results.

A condenser induction motor embodying the present invention is shown in Fig. 14. This motor comprises the main winding $W'$ similar to the winding $W'$ of the motors previously described, this winding being connected between the leads $a$ and $b$. A consequent pole low speed main winding $W^5$ is connected at one end to the mid-point of the high speed winding by a connection 50 and is connected at the other end to the lead $c$. The winding $W^5$ is similar to the winding $W^2$ of the motor first described, but for reasons which will presently appear, its displacement is somewhat larger, preferably about 45 electrical degrees from $W'$. Across the first half (poles 1, 3 and 5) of the winding $W^5$ is connected a condenser circuit consisting of a condenser winding $CW'$ and a condenser 52, and across the second half (poles 2, 4 and 6) of the winding $W^5$ is connected a condenser circuit consisting of a condenser winding $CW^2$ and a condenser 54. A connection 56 between the midpoint of $W^5$ and the junctions of the condensers forms two closed loops, the first loop comprising the poles 1, 3 and 5 of both windings and the condenser 52, and the second loop comprising the poles 2, 4 and 6 of the windings and the condenser 54. The sections of the condenser windings are displaced approximately 45 electrical degrees from corresponding sections of the winding $W^5$. The displacements above mentioned are in electrical degrees for high speed operation. For low speed operation, the displacements in electrical degrees are doubled, that is, the sections of the condenser winding are displaced 90 electrical degrees from the sections of $W^5$ and similarly, the sections of $W^5$ are displaced 90 electrical degrees from the sections of $W'$. The winding $W^5$ and $CW'$ have a greater number of turns and hence greater impedance than the winding $W'$. The sections are so disposed as to give the instantaneous polarities indicated for a given direction of current. Thus, for current from left to right, sections 1, 3 and 5 of $W'$ form north poles, sections 2, 4 and 6 of $W'$ form south poles, all sections of $W^5$ form north poles, and all sections of $CW'$ and $CW^2$ form south poles.

The condenser motor is adapted for connection to the lines according to any of the six cases described by the motor of Figs. 1 to 8. Thus, with the leads $a$ and $b$ connected to opposite lines, the motor operates at high speed, regardless of whether the lead $c$ is connected to either line or is inactive. For low speed operation, the lead $c$ is connected to one line and either or both of the leads $a$ and $b$ are connected to the other line.

Considering first the high speed operation with the lines $a$ and $b$ connected to opposite lines and the lead $c$ inactive, it will be seen that at starting, the winding $W'$ is directly energized. The winding $W^5$ being displaced 45° from the winding $W'$ is energized by induction from $W'$. The condenser winding has no voltages induced therein at starting because of its 90° displacement from the winding $W'$. By virtue of the voltages induced in the winding $W^5$, currents are caused to flow through the two closed loops. The sections of $W^5$ necessarily assume the same polarities as the corresponding sections of $W'$, and the voltages induced in the halves of $W^5$ cause currents to flow, which make the sections of $CW'$ and $CW^2$ of polarities opposite to the polarities of corresponding sections of $W^5$. Thus, when poles 1, 3 and 5 of $W'$ are north, and poles 2, 4 and 6 are south, poles 1, 3 and 5 of $W^5$ are likewise north, poles 2, 4 and 6 of $W^5$ are likewise south, and the currents caused to flow in the condenser circuits make the poles of $CW'$ south and the poles of $CW^2$ north. Starting torque is produced because the currents in the loops are displaced, both in time and space, from the current in the main winding $W'$. As the motor comes up to speed, the loops are energized not only by induction from the winding $W'$, but also by speed voltages induced in $W^5$, $CW'$ and $CW^2$ by the rotation of the rotor. These speed voltages are in such directions as to be additive around either loop, in other words, so that currents of considerable magnitude flow through the condensers. A true condenser motor action for six-pole operation thus exists. It will be noted that although $W^5$, $CW'$ and $CW^2$ are consequent pole windings, in that they are wound for poles of the same polarity throughout for currents in a given direction, nevertheless the currents induced in the loops are in such directions as actually to produce alternate poles.

Two other high speed connections are possible, namely, with the lead $c$ connected either to the lead $a$ or the lead $b$. These connections are in general similar to cases 5 and 6 for the first motor previously described in that the consequent pole winding is connected across one half of the winding $W'$. The condenser motor action is in no way affected, the only result being a slight increase of internal losses due to the continuous energization of the winding $W^5$ and the condenser winding by the voltage impressed thereon.

Low speed operation will be described by assuming lead $c$ connected to one line and lead $a$ to the other line. In this case, the windings $W^5$, $CW'$ and $CW^2$ act to give the proper condenser motor operation with twelve poles. Inasmuch as the condenser winding sections are displaced 90 electrical degrees from the winding $W^5$, the condenser circuits are not energized by induction but this is unnecessary because they are energized directly by voltages impressed on the winding $W^5$ and the condenser circuits in parallel. Sections 1, 3 and 5 of the winding $W'$ do not affect the operation of the motor appreciably, because $W^5$ predominates on account of its relatively high impedance and greater number of ampere turns. The motor comes up to speed and operates as a twelve pole motor. It will be noted that $W^5$, $CW'$ and $CW^2$ now operate as consequent pole windings. When the sections of $W^5$ are all north, the sections of $CW'$ and $CW^2$ are all south. Since the polarity of each section of the condenser winding is opposite to the polarity of the corresponding section of $W^5$, the motor operates with a torque in the same direction as for the high speed connection.

For low speed operation, the conditions are practically the same if the lead $b$ or the leads $a$ and $b$ together are connected to the line. With the lead $b$ alone, sections 2, 4 and 6 of the winding $W'$ are in series with the low speed winding, and when the leads $a$ and $b$ together are connected to the line, the two halves of the winding $W'$ are connected in parallel to each other. In any case, the winding $W^5$ is the stronger winding, because of its greater number of ampere turns.

The condenser motor starts satisfactorily, no additional starting means being necessary because of the displacement of currents brought about by the condensers. The motor can be connected with any combination of leads to the lines without danger of generating excessive internal losses.

The condenser induction motor shown in Fig. 14 may be connected to the lines through automatic switches in the same manner as the motor shown in Fig. 9 to effect the desirable dual speed control.

Although any desired displacement between the winding $W^5$ and the condenser winding may be employed, the displacement of 45° for the high speed connection and 90° for the low speed connection has been found most satisfactory. Smaller displacements may in some cases be desirable, especially when the motor is to be used primarily on the high speed connection because then the induced voltages in the windings will be increased and thus result in an increase in the condenser current, although this effect is to some extent compensated by the fact that the condenser current tends to swing more nearly into phase with the main winding current. Displacements greater than the preferred values are not ordinarily to be recommended because on the low speed connection, the condenser current may have a component in such a direction as to tend to reduce, if not to reverse, the starting torque.

It will be seen that any form of the motor herein described has the advantage that it is not only simple in construction and efficient in operation, but also prevents the building up of destructive losses in the event of careless connection. Moreover, each form of motor, although utilizing high and low speed windings, requires no special or additional starting winding. The motor requires only three external leads and any differences in operation are brought about by variations in connections of the leads, no internal changes being necessary.

Although preferred forms of the invention have been described, it will be understood that the invention is not limited to the precise forms herein described, but various modifications thereof may be made within the scope of the invention.

Having thus described the invention, what is claimed is:

1. An induction motor having, in combination, a rotor, an alternate pole winding comprising two portions in series, each portion including winding sections of the same polarity, a consequent pole winding having all sections of the same polarity in series, a connection from the middle of the alternate pole winding to one end of the consequent pole winding, a line lead at the other end of the consequent pole winding, line leads at opposite ends of the alternate pole winding, the polar axis of each section of the consequent pole winding being displaced from the axis of the corresponding section of the alternate pole winding, and means for connecting one winding to form a circuit having a different time constant from the other winding for starting.

2. An induction motor having, in combination, a rotor, an alternate pole winding comprising two portions in series, each portion including winding sections of the same polarity, a consequent pole winding having all sections of the same polarity in series, a connection from the middle of the alternate pole winding to one end of the consequent pole winding, a line lead at the other end of the consequent pole winding, and line leads at opposite ends of the alternate pole winding, the consequent pole winding having higher impedance than the alternate pole winding, whereby the motor may be operated at high speed with the line leads of the alternate pole winding connected to lines regardless of the connection of the line lead of the consequent pole winding, and at low speed with the line lead of the consequent pole winding connected to one line and either or both of the line leads of the alternate pole winding connected to the other line.

3. An induction motor having, in combination, a rotor, an alternate pole winding, connections to form two portions of said winding, each portion including sections wound on poles of like polarity, a consequent pole winding connected in two portions with sections thereof in inductive relationship with corresponding sections of the alternate pole winding, a connection between the windings, and means for individually connecting the portions of the consequent pole winding to form circuits having a different time constant from the alternate pole winding for starting.

4. An induction motor having, in combination, a rotor, an alternate pole winding, a consequent pole winding displaced therefrom, a connection from an intermediate point of the alternate pole winding to one end of the consequent pole winding, and means for connecting the terminals of the consequent pole winding to form a circuit having a different time constant from the alternate pole winding for starting.

5. An induction motor having, in combination, a rotor, a high speed winding, a low speed winding displaced therefrom, a connection from an intermediate point of the high speed winding to one end of the low speed winding, leads connected to the other end of the low speed winding and to both ends of the high speed winding, a short-circuiting connection around the low speed winding, a switch to open the short-circuiting connection, and a current limiting impedance in the short-circuiting connection.

6. An induction motor having, in combination, a rotor, an alternate pole winding comprising two portions in series, each portion including winding sections of the same polarity, a consequent pole winding having all sections of the same polarity in series, a connection from the middle of the alternate pole winding to one end of the consequent pole winding, a line lead at the other end of the consequent pole winding, line leads at opposite ends of the alternate pole winding, means for short-circuiting portions of one winding at starting, and current limiting means for said short-circuiting means.

7. An induction motor having, in combination, a rotor, an alternate pole winding comprising two portions in series, each portion including winding sections of the same polarity, a consequent pole winding having all sections of the same polarity in series, a connection from the middle of the alternate pole winding to one end of the consequent pole winding, a line lead at the other end of the consequent pole winding, line leads at opposite ends of the alternate pole winding, means for short-circuiting portions of the consequent pole winding at starting, and means for limiting the current through the alternate pole winding to the line lead of the consequent pole winding at starting.

8. An induction motor having, in combination, a rotor, a high speed winding wound on a plurality of poles and comprising two portions, each portion including all parts of the winding wound on poles of like polarity, leads at opposite ends of the high speed winding, a low speed winding wound on the same poles, the low speed winding having a connection to the middle of the high speed winding and a lead at the end thereof, and a cutout switch connecting one of the high speed winding leads with the low speed winding lead at starting.

9. An induction motor having, in combination, a rotor, a high speed winding wound on a plurality of poles and comprising two portions, each portion including all parts of the winding wound on poles of like polarity, leads at opposite ends of the high speed winding, a low speed winding wound on the same poles, the low speed winding having a connection to a point of the high speed winding and a lead at the end thereof, and a cutout switch connecting the low speed winding lead with one of the high speed winding leads and also connecting said lead with an intermediate point of the low speed winding at starting.

10. An induction motor having, in combination, a rotor, a high speed winding wound on a plurality of poles and comprising two portions, each portion including all parts of the winding wound on poles of like polarity, leads at opposite ends of the high speed winding, a low speed winding wound on the same poles, the low speed winding having a connection to a point of the high speed winding and a lead at the end thereof, a cutout switch connecting one of the high speed winding leads with the low speed winding lead at starting, and circuit opening means for breaking the circuit when said leads which are connected by the switch are connected to opposite lines.

11. An induction motor having, in combination, a rotor, two main line leads, a high speed winding comprising two portions connected in series between said leads, the first portion including sections wound on poles of like polarity, and the second portion including sections wound on poles of like polarity but opposite to the polarity of the sections of the first portion, a low speed winding connected at one end to the junction of the two portions of the high speed winding and having a line lead at the opposite end, the low speed winding having two portions, each consisting of sections wound for the same polarity and wound on the same poles as the sections of the high speed winding, the turns per pole of the first portion of the low speed winding being approximately equal to the combined turns per pole of the high speed winding and the second portion of the low speed winding.

12. An induction motor as defined in claim 11, having means for connecting the terminals of one portion of the low speed winding to form a circuit of different time constant from the high speed winding for starting.

13. An induction motor as defined in claim 11, having means for connecting the low speed winding lead with one of the main leads at starting.

14. An induction motor as defined in claim 11, in which the low speed winding sections are displaced from the sections of the high speed winding, and means for connecting the terminals of a portion of the low speed winding to form a circuit of different time constant from the high speed winding for starting.

15. A condenser induction motor having, in combination, an alternate pole main winding, a consequent pole main winding connected at one end to the middle of the alternate pole winding, and a condenser circuit in parallel to the consequent pole main winding and including a condenser winding displaced therefrom.

16. A condenser induction motor having, in combination, an alternate pole main winding, a consequent pole main winding displaced from the alternate pole winding, a condenser circuit including a condenser winding and a condenser energized from the consequent pole main winding, means for energizing the windings with alternate poles for high speed operation, and means for energizing the windings with consequent poles for low speed operation.

17. A condenser induction motor having, in combination, an alternate pole main winding comprising two halves in series, each half including sections of the same polarity, a consequent pole main winding having sections of like polarity, a connection from the junction of the halves of the alternate pole winding to one end of the consequent pole winding, high speed leads connected to the ends of the alternate pole winding, a low speed lead at the end of the consequent pole winding, and two condenser circuits connected across the halves of the consequent pole main winding, each condenser circuit including a condenser and a condenser winding having sections of opposite polarity to corresponding sections of the consequent pole main winding, whereby the motor operates at high speed with the high speed leads connected to opposite lines regardless of the connection of the low speed winding, and at low speed with the low speed lead connected to one line and either or both of the high speed leads connected to the other line.

18. A condenser induction motor having, in combination, an alternate pole main winding, a consequent pole main winding connected at one end of the middle to the alternate pole winding, a condenser circuit in parallel to the consequent pole main winding and including a condenser winding displaced therefrom, the consequent pole main winding being displaced from the alternate pole main winding by approximately 45 electrical degrees for high speed operation, and the condenser winding being displaced from the consequent pole main winding by approximately 45 electrical degrees for high speed operation.

19. A condenser induction motor having, in combination, an alternate pole main winding, a consequent pole main winding displaced from the alternate pole winding, a condenser circuit including a condenser winding and a condenser energized from the consequent pole main winding, means for energizing the windings with alternate poles for high speed operation, means for energizing the windings with consequent poles for low speed operation, the consequent pole main winding being displaced from the alternate pole main winding by approximately 45 electrical degrees for high speed operation, and the condenser winding being displaced from the consequent pole main winding by approximately 45 electrical degrees for high speed operation.

20. A condenser induction motor having, in combination, an alternate pole main winding having two halves, each half including all sections of like polarity, the sections of the two halves being of different polarities when traversed by currents in the same direction, a consequent pole main winding having two halves, each half including alternate sections and all sections being of the same polarity when traversed by currents in the same direction, a condenser circuit across each half of the consequent pole winding, each condenser circuit including a condenser and a condenser winding, corresponding sections of the several windings being displaced with respect to one another, means for energizing the condenser circuits by induction when the alternate pole main winding is connected to the lines for high speed operation, and means for placing sections of the alternate pole winding in series with the consequent pole winding for low speed operation.

21. A condenser induction motor having, in combination, an alternate pole main winding having two halves, each half including all sections of like polarity, the sections of the two halves being of different polarities when traversed by currents in the same direction, a consequent pole main winding having two halves, each half including alternate sections and all sections being of the same polarity when traversed by currents in the same direction, a condenser circuit across each half of the consequent pole winding, each condenser circuit including a condenser and a condenser winding, corresponding sections of the several windings being displaced with respect to one another, a connection from the junction of the halves of the alternate pole main winding to one end of the consequent pole main winding, a lead at the other end of the consequent pole main winding, and leads connected to the ends of the alternate pole main winding.

22. A condenser induction motor as defined in claim 20, in which the condenser winding is displaced from the consequent pole main winding 45 electrical degrees for high speed operation and 90 electrical degrees for low speed operation.

23. A condenser induction motor as defined in claim 21, in which the condenser winding is displaced from the consequent pole main winding 45 electrical degrees for high speed operation and 90 electrical degrees for low speed operation.

24. A two-speed induction motor having, in combination, a high speed winding, a low speed winding connected at one end to an intermediate point of the high speed winding, a lead at one end of the high speed winding connected to a line, leads at the ends of both windings connected to the opposite line, and a switch in each of said last-mentioned leads to operate under different conditions, whereby with both switches open, the windings are inactive, with one switch closed, the low speed winding is energized in series with a part of the high speed winding, and with both switches closed, the high speed winding is energized with the low speed winding across a part thereof.

25. The combination with an inductance motor having an alternate pole winding and consequent pole winding connected to a point of the alternate pole winding, of a lead at one end of the alternate pole winding to be connected to a line, leads at the ends of both windings to be connected to an opposite line, and a switch in each of said last-mentioned leads to operate under different conditions, the consequent pole winding having higher impedance than the alternate pole winding, whereby upon closing of the switch in the lead connected to the consequent pole winding, the motor operates at low speed, and upon closing of both switches, the motor operates at high speed.

26. The combination with an induction motor having an alternate pole winding and consequent pole winding connected to the middle of the alternate pole winding, of a lead at one end of the alternate pole winding to be connected to a line, and leads at the ends of both windings to be connected to an opposite line, and a switch in each of said last-mentioned leads to operate under different conditions, the switches being constructed and arranged for successive operation, whereby upon closure of both switches, the alternate pole winding is energized with the consequent pole winding connected across a part thereof for high speed, and upon opening of the switch in the lead connected to the alternate pole winding, the motor operates at low speed by energization of the consequent pole winding in series with a part of the alternate pole winding.

27. The combination with an induction motor having a rotor, a high speed winding having a plurality of sections and a low speed winding having sections wound on the same poles, of a connection from a point of the high speed winding to one end of the low speed winding, a line lead at one end of the high speed winding, line leads at the opposite ends of both windings, a switch in each of said line leads, whereby upon closing of the switch in the low speed winding lead, the motor operates at low speed, and upon closing of both switches, the motor operates at high speed, the sections of the low speed winding having such numbers of turns that no substantial voltage exists between the ends of the low speed and high speed windings.

28. An induction motor having, in combination, a rotor, a high speed winding comprising two portions in series, each portion comprising sections wound on alternate poles of like polarity, a low speed winding comprising sections all of like polarity and formed in two portions, each comprising sections wound on alternate poles, connections adapted to place the low speed winding across one portion of the high speed winding, the turns per pole of the high speed winding being equal to the difference of turns per pole of the portions of the low speed winding, whereby the voltage on the low speed winding substantially equals the voltage on that portion of the high speed winding across which the low speed winding is connected, a lead at one end of the high speed winding to be connected to a line, leads at the ends of the high speed and low speed windings to be connected to the opposite line, and switches in said leads operating under different conditions, whereby upon closing of the switch in the low speed winding lead, the motor operates at low speed, and upon closing of both switches, the motor operates at high speed with the low speed winding connected across a portion of the high speed winding.

29. The combination with an induction motor having an alternate pole winding and consequent pole winding connected to the middle of the alternate pole winding, condenser circuits connected across the consequent pole winding, each including a condenser winding and a condenser, of a lead at one end of the alternate pole winding to be connected to a line, leads at the ends of both windings to be connected to an opposite line, and a switch in each of said last-mentioned leads to operate under different conditions, the consequent pole winding having higher impedance than the alternate pole winding, whereby upon closing of the switch in the lead connected to the consequent pole winding, the motor operates at low speed, and upon closing of both switches, the motor operates at high speed.

30. An induction motor having, in combination, a high speed winding, a low speed winding connected to give a larger number of poles than the high speed winding, means for connecting the low speed winding in parallel with at least a portion of the high speed winding, additional turns in series with the low speed winding and wound on one or more poles of the high speed winding and approximately equal in number to the total turns of that portion of the high speed winding with which the low speed winding may be connected in parallel.

31. An induction motor having, in combination, a high speed winding, a low speed winding connected to give a greater number of poles than the high speed winding, line leads connected to opposite ends of the high speed winding, a connection between a point of the high speed winding and one end of the low speed winding, a line lead connected to the other end of the low speed winding, additional turns in series with the low speed winding and wound on one or more poles of the high speed winding and approximately equal in number to the total turns of the high speed winding between said connection and one of the line leads, whereby said lead may be connected with the line lead of the low speed winding.

32. An induction motor having, in combination, a high speed winding, a low speed winding connected to give a larger number of poles than the high speed winding, at least one of the poles of the low speed winding being approximately coincident with and of the same polarity as a pole of the high speed winding, and additional turns in series with the low speed winding and wound on said coincident pole and connected to give the same polarity.

33. An induction motor having, in combination, a high speed winding, a low speed winding connected to give a larger number of poles than the high speed winding, at least one of the poles of the low speed winding being approximately coincident with and of the same polarity as a pole of the high speed winding, additional turns in series with the low speed winding and wound on said coincident pole, and connections for utilizing said additional turns for low speed operation.

34. An induction motor having, in combination, a high speed winding, a low speed winding connected to give a larger number of poles than the high speed winding, one or more of the poles of the low speed winding being approximately coincident with and of the same polarity as poles of the high speed winding, means for connecting the low speed winding in parallel with at least a portion of the high speed winding, the low speed winding having additional turns wound on such coincident poles, and equal in number to the total turns of that portion of the high speed winding with which the low speed winding may be connected in parallel.

35. An induction motor having, in combination, a low speed winding, a high speed winding connected to give a smaller number of poles than the low speed winding, the high speed winding being wound in two portions, one portion wound on poles of the same polarity as and approximately coincident with poles of the low speed winding, one end of the low speed winding being connected to the junction between the portions of the high speed winding, and line connections to ends of the high speed winding and the low speed winding.

36. An induction motor having, in combination, a low speed winding, a high speed winding connected to give a smaller number of poles than the low speed winding, the high speed winding being wound in two series portions, one portion including all sections giving poles of the same polarity as and approximately coincident with poles of the low speed winding, one end of the low speed winding being connected to the junction between the portions of the high speed winding, and line connections to ends of the high speed winding and the low speed winding.

37. An induction motor having, in combination, a low speed winding, a high speed winding connected to give a smaller number of poles than the low speed winding, the high speed winding being wound in two series portions, one portion giving poles approximately identical with poles of the low speed winding, and the second portion giving poles nonidentical with poles of the low speed winding, and a connection from the junction of the two portions of the high speed winding to one end of the low speed winding.

38. An induction motor having, in combination, a high speed winding having a number of winding sections in series, a low speed winding having a number of winding sections in series and giving a greater number of poles than the high speed winding, and means for energizing the low speed winding in series with a portion of the high speed winding for low speed operation.

39. An induction motor having, in combination, a high speed winding having a number of winding sections in series, a low speed winding having a number of winding sections in series and giving a greater number of poles than the high speed winding, and means for energizing the high speed winding with a portion thereof in parallel to the low speed winding for high speed operation.

CARLTON L. KENNEDY.

CERTIFICATE OF CORRECTION.

Patent No. 2,033,525. March 10, 1936.

CARLTON L. KENNEDY.

It is hereby certified that error appears in the printed specification of the above numbered patent requiring correction as follows: Page 8, first column, line 62, claim 18, for "of" read to; and same line, for "to" read of; and that the said Letters Patent should be read with these corrections therein that the same may conform to the record of the case in the Patent Office.

Signed and sealed this 28th day of April, A. D. 1936.

Leslie Frazer (Seal)

Acting Commissioner of Patents.